United States Patent
Ding et al.

(10) Patent No.: US 11,007,512 B1
(45) Date of Patent: May 18, 2021

(54) PLATINUM ENCAPSULATED ZEOLITE HYDROCRACKING CATALYST AND METHODS OF MAKING SAME

(71) Applicant: Saudi Arabian Oil Company, Dhahran (SA)

(72) Inventors: Lianhui Ding, Dhahran (SA); Manal Al-Eid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/706,043

(22) Filed: Dec. 6, 2019

(51) Int. Cl.
| | |
|---|---|
| *B01J 29/80* | (2006.01) |
| *B01J 29/70* | (2006.01) |
| *B01J 23/883* | (2006.01) |
| *B01J 37/04* | (2006.01) |
| *B01J 35/00* | (2006.01) |
| *B01J 37/08* | (2006.01) |
| *B01J 23/42* | (2006.01) |
| *C10G 11/05* | (2006.01) |

(52) U.S. Cl.
CPC ............ *B01J 29/70* (2013.01); *B01J 23/883* (2013.01); *B01J 35/0006* (2013.01); *B01J 37/04* (2013.01); *B01J 37/08* (2013.01); *B01J 23/42* (2013.01); *C10G 11/05* (2013.01)

(58) Field of Classification Search
CPC ........ B01J 29/06; B01J 29/061; B01J 29/064; B01J 29/068; B01J 29/076; B01J 29/106; B01J 29/126; B01J 29/146; B01J 29/166; B01J 29/72; B01J 29/74; B01J 29/76; B01J 2029/062; B01J 2229/18; B01J 2229/183; B01J 2229/186; B01J 35/0006; B01J 35/0046; B01J 35/006; B01J 35/1057; B01J 35/1061; B01J 35/109; B01J 37/0201; B01J 37/10; B01J 29/80; B01J 2229/42; C01B 39/02; C01B 39/46; C01B 39/48; C01B 39/52

USPC ...... 502/63, 64, 66, 67, 69, 74, 79; 423/710, 423/713, 718
See application file for complete search history.

(56) References Cited

U.S. PATENT DOCUMENTS

| | | | |
|---|---|---|---|
| 3,674,709 A | * | 7/1972 | Barrer ................. B01J 29/70 502/74 |
| 2008/0035525 A1 | | 2/2008 | Burgfels et al. |
| 2009/0048094 A1 | | 2/2009 | Ring et al. |
| 2016/0051971 A1 | * | 2/2016 | Choi .................... C01B 39/026 502/74 |
| 2016/0243532 A1 | | 8/2016 | Dusselier et al. |
| 2017/0165655 A1 | | 6/2017 | Sinha et al. |
| 2018/0010052 A1 | * | 1/2018 | Sinha .................... C10G 3/48 |
| 2019/0176137 A1 | | 6/2019 | Sontyana et al. |
| 2019/0284057 A1 | | 9/2019 | Abudawoud et al. |

OTHER PUBLICATIONS

Sibi et al., "Improved hydrogenation function of Pt@SOD incorporated inside sulfided NiMo hydrocracking catalyst", Catal. Sci. Technol. 6, 2016, pp. 1850-1862.*
Goel et al., "Synthesis and Catalytic Properties of Metal Clusters Encapsulated within Small-Pore (SOD, GIS, ANA) Zeolites", J. Am. Chem. Soc. 134, 2012, pp. 17688-17695.*
Fan et al. "Crystal transformation synthesis, hydrogenation activity and sulfur-tolerant performance of Pt particles encapsulated in sodalite" Journal of Fuel Chemistry and Technology, vol. 44, Issue 4, Apr. 2016, 6 pgs.
Yang et al. "Incorporating platinum precursors into a NaA-zeolite synthesis mixture promoting the formation of nanosized zeolite" Microporous and Mesoporous Materials 117 (2009) 33-40, 8 pgs.
International Search Report and Written Opinion dated Mar. 18, 2021 pertaining to International application No. PCT/US2020/060678 filed Nov. 16, 2020, 15 pgs.

* cited by examiner

*Primary Examiner* — Elizabeth D Wood
(74) *Attorney, Agent, or Firm* — Dinsmore & Shohl LLP

(57) ABSTRACT

Embodiments of the present disclosure are directed to hydrocracking catalysts and methods of making same. The hydrocracking catalyst comprises a platinum encapsulated zeolite having a crystallinity greater than 20% determined by X-ray powder diffraction analysis.

15 Claims, 2 Drawing Sheets

PLATINUM ENCAPSULATED ZEOLITE HYDROCRACKING CATALYST AND METHODS OF MAKING SAME

BACKGROUND

Technical Field

The present disclosure generally relates to hydrocracking technology and, more specifically, to platinum encapsulated zeolite hydrocracking catalysts and methods of making these hydrocracking catalysts.

Background

Compared with conventional steam cracking feedstocks, for example, narrow fractions like natural gas, naphtha, and diesel, the whole crude feedstocks include more impurities and a considerable amount of polyaromatics, which cannot be directly converted by steam cracking. To maximize the olefin and benzene, toluene, and xylene (BTX) production from whole crude feedstock, the whole crude feedstocks require hydroprocessing to remove the impurities (S, N, and metals), convert polyaromatics, and convert the heavy fraction to lighter fractions.

Hydrogenation of polyaromatics and hydrocracking of crude oil are critical hydroprocessing steps to upgrade crude oil and convert crude oil to clean fuel and petrochemicals. Noble-metal-supported catalysts are often used in polyaromatics hydrogenation and hydroconversion. However, the noble metal catalysts are very susceptible to sulfur poisoning even at a few parts per million (ppm) of $H_2S$ or sulfur compounds. Zeolite Y is a widely used cracking component for use in heavy oil hydrocracking catalysts. If a metal such as platinum (Pt) is supported on Zeolite Y, which has large pore size (about 0.75 nm), $H_2S$ can easily access and poison the Pt active sites. Sodalite zeolite, which is often used as a noble metal support, has pore sizes of 0.30 nm or less, which prevents the large molecules in the crude oil from diffusing in and out of the zeolite pores; however, larger molecules cannot be effectively hydrocracked, which greatly reduces the reaction efficiency.

BRIEF SUMMARY

Thus, there is a need for hydrocracking catalysts to have improved hydrocracking efficiency, while reducing sulfur poisoning of catalysts.

Embodiments of the present disclosure meet this need for improved hydrocracking catalysts. Specifically, the present hydrocracking catalysts comprise platinum encapsulated in sodalite zeolite cages (Pt/SOD). The pore openings of the sodalite zeolite cages are sufficiently small to exclude the smallest sulfur-containing molecules ($H_2S$, 0.36 nm), while allowing hydrogen molecules (0.28 nm) to diffuse into and out of the sodalite cage and to react on Pt clusters to form efficiently disassociated hydrogen atoms. These dissociated hydrogen atoms can spill over to adjacent hydrogenation or acid sites, such as alumina, zeolite Y, NiMo, and NiW metals, where the larger hydrocarbon molecules can be hydrogenated and cracked. Therefore, mixing the Pt encapsulated sodalite with a larger pore sized Zeolite Y can greatly enhance hydrocracking of the crude oil.

In accordance with one embodiment of the present disclosure, a method of making a hydrocracking catalyst is provided. The method comprises: adding sodium hydroxide, an aluminum compound, a salt having an anion and a cation, and a silicon compound to an aqueous solution to form an aqueous mixture; stirring the aqueous mixture; adding a platinum compound to the aqueous mixture to form a pre-catalyst mixture; heating the pre-catalyst mixture at from 80° C. to 200° C. for at least 24 hours, thereby crystalizing the pre-catalyst mixture to form the hydrocracking catalyst comprising platinum encapsulated zeolite.

In accordance with another embodiment of the present disclosure, a hydrocracking catalyst is provided. The hydrocracking catalyst may comprise platinum encapsulated zeolite, the platinum encapsulated zeolite having a crystallinity greater than 20% determined by X-ray powder diffraction analysis.

DETAILED DESCRIPTION

Figure 1:
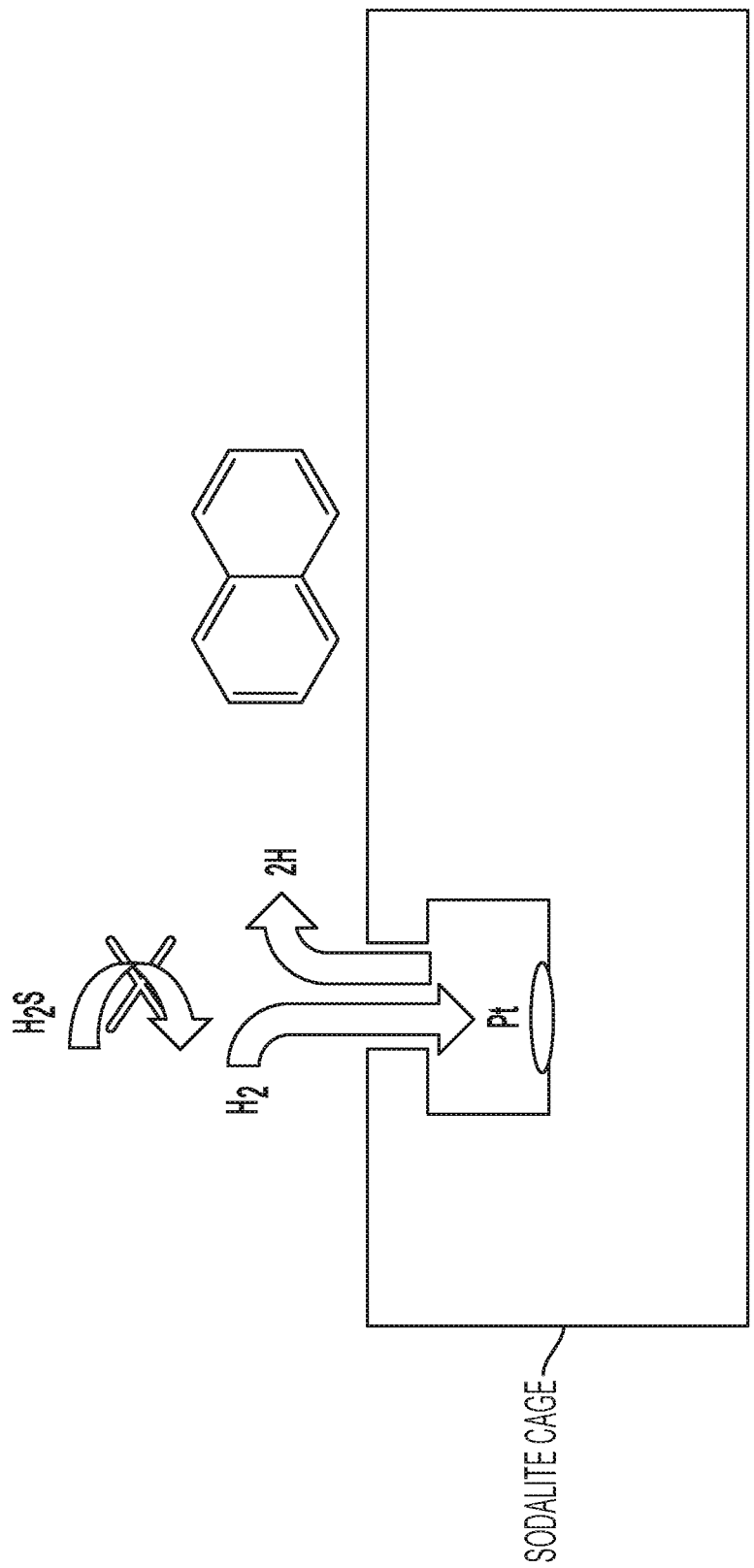
FIG. 1 is a schematic of the hydrocracking catalyst as well as the hydrocracking reaction according to one or more embodiments of the present disclosure.

Embodiments of the present disclosure are directed to hydrocracking catalysts and methods of making, and are specifically directed to hydrocracking catalysts comprising Pt encapsulated zeolite. Further embodiments are directed to hydrocracking catalysts comprising these hydrocracking catalysts, additional zeolites such as zeolite Y, as well as hydrogenation catalysts (e.g., NiMo or NiW).

As used throughout this disclosure, "whole crude", "crude oil", or "whole crude feedstock" refers to unrefined petroleum crude oil, as well as crude oil that has undergone some pre-treatment before hydrocracking. As used in this disclosure, "pretreatment" encompasses water-oil separation, gas-oil separation, desalting, stabilization, or combinations of such; however, it does not encompass crude oil, which undergoes distillation (e.g., vacuum distillation or atmospheric distillation) prior to hydrocracking. The crude oil may have an American Petroleum Institute (API) Gravity (°) of 10° to 50°.

As used throughout this disclosure, the term "hydrocracking" involves the catalytic cracking of heavy hydrocarbon molecules in the crude oil into smaller olefins and aromatics, the cracking being performed in the presence of at least one catalyst and hydrogen. "Hydrocracking" also encompasses hydrogenation, which involves adding hydrogen to unsaturated hydrocarbons, such as olefins and aromatics, for stabilization of petroleum products and aromatic reduction. Specifically, the hydrogenation converts olefins and aromatics into paraffins and naphthenes. Moreover, "hydroprocessing" encompasses hydrocracking and additional reaction mechanisms, for example, hydrodearomatization, hydrodenitrogenation, hydrodesulfurization, or combinations of such.

Embodiments for making the hydrocracking catalysts are provided below. According to one embodiment, the hydrocracking catalyst is produced by adding sodium hydroxide, an aluminum compound, a salt having an anion and a cation, and a silicon compound to an aqueous solution to form an aqueous mixture; stirring the aqueous mixture; adding a platinum compound to the aqueous mixture to form a pre-catalyst mixture; heating the pre-catalyst mixture at from 80° C. to 200° C. for at least 24 hours, thereby crystalizing the pre-catalyst mixture to form the hydrocracking catalyst comprising platinum encapsulated zeolite. As will be described in further detail in subsequent paragraphs, the platinum encapsulated zeolite may comprise sodalite.

Various compounds are considered suitable for the aluminum compound, for example, aluminum metal powder, aluminum hydroxide ($Al(OH)_3$), sodium aluminate ($NaAlO_2$), or combinations thereof. In one embodiment, the aluminum compound comprises aluminum hydroxide.

In one or more embodiments, the silicon compound may comprise silica, sodium silicate, colloidal silica, fumed silica, or combinations thereof. In one embodiment, the silicon compound comprises colloidal silica.

The salt may comprise sodium chloride, potassium dichromate, calcium chloride, sodium bisulfate, copper sulfate, or combinations thereof. In one embodiment, the salt comprises sodium chloride.

Furthermore, various compounds are considered suitable for the platinum compound, such as a platinum salt. The platinum salt may comprise $Pt(NH_3)Cl_2$, $PtCl_2$, $PtCl_4$, $(NH_4)2PtCl_6$, $(NH_4)2Pt(NO_3)_2$, $Na_2PtCl_6 \cdot 6H_2O$, $H_2PtCl_6 \cdot 6H_2O$, $Na_2PtCl_4 \cdot 4H_2O$, $(NH_4)2PtCl_4$, or combinations thereof. In one embodiment, the platinum compound comprises $(NH_4)2PtCl_4$.

Based on the varied component possibilities described above, it is contemplated that the pre-catalyst mixture or pre-catalyst slurry may encompass many different component mixtures. In one or more embodiments, the pre-catalyst mixture comprises $xNaOH: 1Al_2O_3: 2SiO_2: yNaCl: z(NH_4)2PtCl_4: wH_2O$, where $x=10\text{-}30$, $y=0\text{-}10$, $z=0.02\text{-}0.5$, and $w=100\text{-}500$.

Various processing conditions may be utilized to produce the platinum encapsulated zeolite. For example, the pre-catalyst mixture may be heated for at least 12 hours, at least 24 hours, at least 48 hours, or at least 72 hours. Moreover, additional steps such as flushing are contemplated after the formation of the platinum encapsulated zeolite. For example, the platinum encapsulated zeolite may be flushed by: adding a second aqueous solution (e.g., deionized water) to the platinum encapsulated zeolite; stirring the platinum encapsulated zeolite within the second aqueous solution (e.g., deionized water); and centrifuging the platinum encapsulated zeolite within the second aqueous solution to separate the platinum encapsulated zeolite from the second aqueous solution. This flushing step may be conducted repeatedly until the second aqueous solution comprises less than 1 ppm of the anion after separating the platinum encapsulated zeolite from the second aqueous solution.

Moreover, the process may include comprising drying the platinum encapsulated zeolite for at least 2 hours, or at least 4 hours, or at least 8 hours. In addition to drying duration, various drying temperatures are suitable. For example, the drying temperature may be from 90 to 150° C., or from 100° C. to 120° C.

In further embodiments, the platinum encapsulated zeolite may be blended with other components, such as zeolites, alumina and additional metal-based catalysts. In one embodiment, the platinum encapsulated sodalite zeolite is blended with zeolite Y. In a specific embodiment, zeolite Y comprises ultra stable zeolite (USY). Moreover, metal-based catalysts such as nickel, molybdenum, tungsten, or combinations thereof may be blended with the zeolite Y and the platinum encapsulated zeolite. The addition of these metal-based catalysts may include mixing or impregnation into zeolite Y, the platinum encapsulated zeolite, or combinations thereof. As would be familiar to the skilled person, the zeolite Y, alumina, platinum encapsulated zeolite, and the metal-based catalyst (e.g., Ni) may be blended in combination with a binder.

For illustration and not by way of limitation, an exemplary embodiment of producing a hydrocracking catalyst is provided. As an initial step, a hydrothermal synthesis method is utilized for producing the Pt-encapsulated sodalite. The gel composition is $xNaOH:1Al_2O_3:2SiO_2: yNaCl: zPt\ salt: wH_2O$ where $x=10\text{-}30$, $y=0\text{-}10$, $z=0.02\text{-}0.5$, and $w=100\text{-}500$. A typical synthesis method is listed as follows:

(1) NaOH is dissolved in deionized $H_2O$.

(2) $Al(OH)_3$ is added and gently heated under stirring into the solution obtained from step (1) until the Al is completely dissolved to form clear solution. The water loss during heating is made up during this step.

(3) Colloidal $SiO_2$ and NaCl are added into the clear solution from (2), vigorously stirred for 30-60 minutes to form a slurry.

(4) Add $(NH_4)2PtCl_4$ (or $PtCl_2$ or $Na_2PtCl_6$), stirred until completely dissolved.

The slurry from (4) is transferred into a polypropylene bottle, sealed, and then put into an oven at 80-200° C. for 24-72 hours.

After crystallization, the solid product is transferred into a polypropylene beaker, added water, stirred at 60° C. for 30 min, and then Centrifuged for separation of the solid product. This may be repeated until no Cl− is detected in solution (test with 0.1M $AgNO_3$ solution).

The solid product is then dried at 100-120° C. overnight. With the aforementioned zeolite Y and Pt-sodalite, the hydrocracking catalysts are prepared either by mixing or impregnation method.

In addition to methods of making, additional embodiments are directed to the hydrocracking catalysts produced therefrom. As stated previously, the hydrocracking catalysts may comprise a platinum encapsulated zeolite having a crystallinity greater than 20% determined by X ray powder diffraction analysis.

Figure 2:
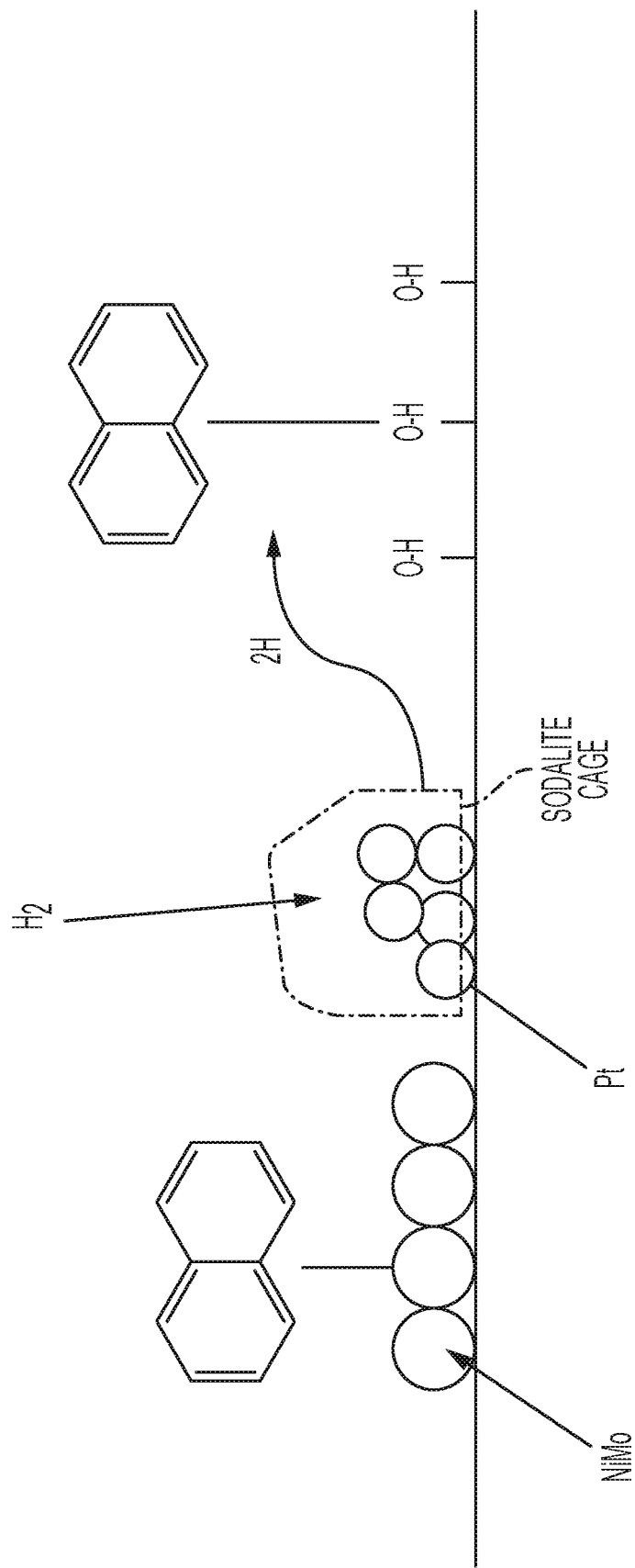
FIG. 2 is a schematic of the hydrocracking catalyst as well as the hydrocracking and the hydrogenation reactions according to one or more embodiments of the present disclosure.

In one or more embodiments, the zeolite may be a sodalite ($Na_8(Al_6Si_6O_{24})Cl_2$) zeolite, which contains a cubic crystal structure. In one embodiment, the sodalite has a Si/Al molar ratio is 0.8 to 1.2, or 1. Sodalite has a six-membered oxygen aperture with a narrow pore diameter. Only very small molecules such as hydrogen (2.8 Å), helium (2.6 Å), ammonia (2.5 Å), and water (2.65 Å) can access and enter the voids making socialite a suitable candidate in separation of these smaller molecules. This cubic crystal structure of the sodalite, which is also called a sodalite cage, encapsulates the platinum. Referring to FIGS. 1 and 2, the pore size of the sodalite cage may range between the kinetic diameters of $H_2$ and $H_2S$. Therefore, the $H_2S$ is excluded from entering the sodalite cage, while hydrogen molecules can enter into the sodalite cage to be adsorbed and react on the Pt cluster encapsulated by the sodalite. As a result, the hydrogen can be easily and efficiently disassociated to H atoms, which is highly active for polyaromatic hydrogenation and cracking of larger molecules. Due to pore size of the sodalite, the Pt inside the sodalite cannot be poisoned by the $H_2S$ and other sulfur compounds.

As stated previously, the pore size of the sodalite needs to be sufficient to exclude the smallest sulfur-containing molecules, while allowing hydrogen molecules to diffuse into and out of the sodalite cages. In one or more embodiments, the pore size of the sodalite may be from 0.10 nm to 0.30 nm, from 0.15 nm to 0.30 nm, from 0.25 nm to 0.30 nm, or 0.30 nm when calculated using the Brunauer-Emmett-Teller (BET) technique. The surface area of the sodalite may be from 0.05 to 0.20 m²/g, from 0.05 to 0.20 m²/g, from 0.10 to 0.15 m²/g, or 0.12 m²/g. The pore volume of the sodalite may be from 0.05 to 0.20 ml/g, from 0.05 to 0.20 ml/g, from 0.10 to 0.15 ml/g, or 0.13 ml/g.

In further embodiments, the platinum encapsulated zeolite (e.g., Pt-sodalite) comprises greater than 35% crystallinity, or greater than 50% crystallinity, or greater than 75% crystallinity, or greater than 95% crystallinity. In further embodiment, the hydrocracking catalyst may comprise a crystallinity of 25 to 50%, from 30 to 45%, or from 30 to 40% as measured according to X-ray powder diffraction analysis.

As described previously and shown in FIGS. 1 and 2, the platinum encapsulated sodalite can dissociate H atoms, which spill over to adjacent hydrogenation sites or acid sites to assist in cracking and hydrogenation. As a result, further embodiments of the hydrocracking catalysts may include additional zeolites such as zeolite Y. Further embodiments may also include alumina. In one embodiment, the zeolite Y comprises ultra stable zeolite Y (USY). When the platinum encapsulated sodalite is blended with the zeolite Y, it is contemplated that the sodalite cage is adjacent the zeolite Y framework or disposed within the zeolite Y framework.

The zeolite Y may be defined by various properties. For example, the zeolite Y may have a $SiO_2/Al_2O_3$ Mole Ratio may be from 5 to 80, from 10 to 60, from 20 to 60, or from 30-50. Additionally, the zeolite Y may have a surface area greater than 700 m²/g. In another embodiment, the zeolite Y may have a surface area from 700 to 750 m²/g. As mentioned previously, the zeolite Y will have bigger pore sizes than the sodalite cage, for example, about from 0.70 to 0.80 nm, or from 0.74 to 0.76 nm.

Moreover, the hydrocracking catalyst may include hydrogenation catalysts, which typically comprise metal-based materials. These metal-based materials may include metal elements, metal oxides, metal hydroxides, alloys, and combinations thereof. In one or more embodiments, these metal-based materials may comprise nickel, molybdenum, tungsten, or combinations thereof. Structurally, the metal-based materials may be impregnated within the zeolite Y, the platinum encapsulated zeolite, the alumina, or combinations thereof. Moreover, metal-based materials may be disposed on the surfaces of the zeolite Y, the platinum encapsulated zeolite, the alumina, or combinations thereof. In operation, large hydrocarbon molecules can be hydrogenated and cracked by the hydrogenation catalysts in combination with the dissociated ions produced from the hydrocracking performed by the Pt encapsulated sodalite. While the present discussion categorized catalysts like nickel supported zeolite Y as hydrogenation catalysts, concurring reactions like hydrocracking are also contemplated and expected.

In one embodiment, the hydrocracking catalyst may comprise a NiMo catalyst. In one or more embodiments, the hydrocracking catalyst may comprise 5 wt. % to 50 wt. %, 10 wt. % to 40 wt. %, or 10 to 20 wt. % NiMo catalyst. The NiMo catalyst may comprise a combination of metal-based materials, for example, $MoO_3$ and NiO. In one or more embodiments, the hydrocracking catalyst may comprise 10 to 20 wt. %, or 14 to 16 wt. % $MoO_3$, and additionally 1 to 10 wt. %, or 4 to 6 wt. % NiO.

In another embodiment, the hydrocracking catalyst may comprise a NiW catalyst. In one or more embodiments, the hydrocracking catalyst may comprise 5 wt. % to 50 wt. %, 10 wt. % to 40 wt. %, or 20 to 30 wt. % NiW catalyst. The NiW catalyst may comprise a combination of metal-based materials, for example, $WO_3$ and NiO. In one or more embodiments, the hydrocracking catalyst may comprise 20 to 30 wt. %, or 20 to 26 wt. % $WO_3$, and additionally 1 to 10 wt. %, or 4 to 6 wt. % NiO.

Moreover, the hydrocracking catalyst may comprise 10 to 80 wt. % of platinum encapsulated sodalite and zeolite Y, or from 10 to 60 wt. % of platinum encapsulated sodalite and zeolite Y, or from 20 to 60 wt. % of platinum encapsulated sodalite and zeolite Y, or from 30 to 60 wt. % of platinum encapsulated sodalite and zeolite Y, or from 40 to 60 wt. % of platinum encapsulated sodalite and zeolite Y. The hydrocracking catalyst may comprise 1 to 30 wt. % platinum encapsulated sodalite, or from 1 to 20 wt. % platinum encapsulated sodalite, or from 1 to 10 wt. % platinum encapsulated sodalite. Moreover, the hydrocracking catalyst may comprise 10 to 60 wt. % zeolite Y, or from 20 to 50 wt. % zeolite Y, or from 30 to 50 wt. % zeolite Y.

In one or more embodiments, the hydrocracking catalyst comprises less than 20 wt. % platinum, or less than 15 wt. % platinum, or less than less than 5 wt. % platinum based on the overall weight of the hydrocracking catalyst.

Optionally, the hydrocracking catalyst may comprise alumina ($Al_2O_3$) mixed with the other components. Various amounts are contemplated, for example, 10 to 80 wt. %, 20 to 80 wt. %, 10 to 70 wt. %, 10 to 50 wt. %, 20 to 40 wt. %, or from 25 to 35 wt. % $Al_2O_3$. The alumina may be defined by various properties; however, the alumina will have a larger pore size than the sodalite. For example, the alumina may have a pore size greater than 10 nm, and a surface area greater than 150 m²/g.

In another embodiment, the NiMo catalyst may comprise from 10 to 20 wt. % $MoO_3$, from 1 to 10 wt. % NiO, from 20 to 80 wt. % $Al_2O_3$, and from 10 to 60 wt. % of platinum encapsulated sodalite and zeolite Y. In yet another embodiment, the NiW hydrocracking catalyst comprises from 20 to 30 wt. % $WO_3$, from 1 to 10 wt. % NiO, from 20 to 80 wt. % $Al_2O_3$, and from 10 to 60 wt. % of platinum encapsulated sodalite and zeolite Y.

Testing Methods
BET Technique

The sample texture properties, including surface areas, pore volumes, pore sizes, and pore size distributions, were characterized by physisorption using the BET technique on data acquired from a Quantachrome Autosorb iQ instrument. Before adsorption, the samples were calcined at 873K for 4 hrs. Approximately 30-40 mg of powder samples were degassed in a sample preparation station under 473K and 1.33E-3 Pa for 15 hours, then switched to the analysis station for adsorption and desorption under liquid nitrogen at 77K with an equilibrium time of 2 minutes. The surface area was calculated with the multipoint BET equation with linear region in the P/Po range of 0.05 to 0.35. Pore volume was calculated from the maximum adsorption amount of nitrogen at P/Po=0.99.

XRD Powder Diffraction Analysis

The crystallinity and phase purity of the solid products was measured by powder X-ray diffraction (XRD) using a Rigaku Ultima IV multi-purpose diffractometer with a copper X-ray tube. The scanning range was set between 2° to 50° in 2θ Bragg-angles with a step size of 0.04° and the total counting time of 1° per minute. The crystallinity percentage was calculated by PANalytical High Score Plus software through the comparison of the area under the most intense diffraction peaks to that of patterns of the reference zeolite (sodalite without encapsulated Pt). The crystallinity of the reference (comparative) zeolite is 100%.

Examples

With $PtCl_2$ and $(NH_4)2PtCl_4$ as Pt source, the hydrothermal synthesis of Pt-sodalite was conducted, the gel composition and synthesis conditions are summarized in Table 1. The results show that, under all conditions, the Pt-sodalite can be formed. With the Pt content increase, the relative crystallinity dramatically decreased.

TABLE 1

Pt/Sodalite hydrothermal synthesis using different Pt sources and amounts

| Sample name | SZ-5 | SZ-6 | SZ-7 |
|---|---|---|---|
| Gel molar ratio | | | |
| PtCl$_2$ | | | 1.0 |
| NaOH | 20 | 20 | 15 |
| Al$_2$O$_3$ | 1 | 1 | 1 |
| SiO$_2$ | 1 | 1 | 1 |
| (NH$_4$)$_2$PtCl$_4$ | 2 | 0.05 | 0 |
| H$_2$O | 300 | 300 | 300 |
| Hydrothermal conditions | | | |
| Temperature | 140 | 140 | 140 |
| Time, hour | 72 | 168 | 48 |
| Dried solid yield, g | 4.58 | 3.13 | 0.53 |
| XRD results | Sodalite | Sodalite | Sodalite |
| Crystallinity, % | 20 | 100 | 38 |
| Pt, wt. % | 59 | 2.8 | 14.54 |

Referring to Table 2 below, with SZ-6 Pt/sodalite, a hydrocracking catalyst was synthesized. Meanwhile, a reference catalyst without SZ-6 zeolite was synthesized under the same composition and synthesis procedures. The hydrothermally synthesized SZ-6 and/or USY zeolite (CBV-760 from Zeolyst) were mixed with large-pore alumina (Sasol PURALOX TH100/150, pore volume 0.96 mL/g, specific surface area 201.6 m$^2$/g), MoO$_3$, nickel nitrate hexahydrate, and binder (partially acid-peptized alumina, SASOL, CATAPAL B), extruded to form cylindrically shaped extrudate, dried at 383 K overnight, and then calcined in air at 773 K for 4 h. The composition of the inventive catalyst and comparative catalyst are summarized in Table 2.

TABLE 2

The compositions of the catalysts with and without Pt/sodalite.

| No. | MoNi/Pt-sodalite-USY | MoNi/USY |
|---|---|---|
| Composition, wt. % | | |
| MoO$_3$ | 15 | 15 |
| NiO | 5 | 5 |
| USY | 40 | 50 |
| Pt/sodalite (SZ-6) | 10 | |
| Al$_2$O$_3$ | 30 | 30 |

Catalyst performance tests were carried out in a 5 ml fix-bed microreactor (Autoclave Engineer, BTR-Jr-PC) in a continuous operating mode. The 3 ml 20-40 mesh catalyst was diluted with 100 mesh sand of the same volume. Before each run, the catalysts were pre-sulfided in situ in a 20 vol % H$_2$S/H$_2$ stream at 320° C. for 2 h and 360° C. for another 2 h under a hydrogen pressure of 220 psi, LHSV 2.0 h-1, and hydrogen flow rate 200 ml/min. 1-methylnaphthlene (MN) (20 wt. % in hexadecane) was used as the model compound. The model compound were fed into the system with a HPLC pump. The liquid product were analyzed by a GC-MS (SHIMADZU GCMS-QP5000). The evaluation conditions: reaction temperature 350° C., H$_2$ pressure 220 psig, LHSV 2.0 h-1, and H$_2$/MN volume ratio 1000:1. In order to test the sulfur resistance of Pt/sodalite, a certain amount of DMDS (equivalent to 20 ppm H$_2$S) was added to the reactor along with the 1-MN for some tests. The evaluation results are listed in Table 3. Compared with the MoNi/USY catalyst, the addition of the Pt encapsulated sodalite, the 1-MN hydrogenation and conversion increased about 24 wt. %. Pt is located inside the sodalite, and cannot be poisoned by H$_2$S. thus, when 20 ppm of H$_2$S was introduced, the 1-MN conversion is only slightly deceased.

TABLE 3

The reaction performance of the invented and reference catalysts

| Catalyst | Inventive MoNi/Pt-sodalite-USY | Comparative MoNi/USY |
|---|---|---|
| H$_2$S, ppm | | 20 |
| 1-MN conversion, wt. % | 85.2 | 80.1 | 61.4 |
| Product distribution, wt. % | | | |
| Methyl-butyl benzene | 21.6 | 19.9 | 10.7 |
| Pentybenzene | 22.8 | 21 | 11.9 |
| Methyl tetrahydronaphthlene | 40.9 | 39.2 | 39 |
| 1-MN | 14.8 | 19.9 | 38.6 |

It should be understood that the various aspects of the hydrocracking catalysts and the methods of making these hydrocracking catalysts may be utilized in conjunction with various other aspects.

According to a first aspect, a method of producing a hydrocracking catalyst is provided, in which the method comprises: adding sodium hydroxide, an aluminum compound, a salt having an anion and a cation, and a silicon compound to an aqueous solution to form an aqueous mixture; stirring the aqueous mixture; adding a platinum compound to the aqueous mixture to form a pre-catalyst mixture; and heating the pre-catalyst mixture at from 80° C. to 200° C. for at least 24 hours, thereby crystallizing the pre-catalyst mixture to form the hydrocracking catalyst comprising platinum encapsulated zeolite.

According to a second aspect, which includes the first aspect, the zeolite is sodalite.

According to a third aspect, which includes any of the first or second aspects, the hydrocracking catalyst comprises greater than 20% crystallinity determined by X ray powder diffraction analysis.

According to a fourth aspect, which includes any of the first through third aspects, the aluminum compound comprises aluminum metal powder, aluminum hydroxide, sodium aluminate, or combinations thereof.

According to a fifth aspect, which includes any of the first through fourth aspects, the silicon compound comprises silica, sodium silicate, colloidal silica, fumed silica, or combinations thereof.

According to a sixth aspect, which includes any of the first through fifth aspects, the salt comprises sodium chloride, potassium dichromate, calcium chloride, sodium bisulfate, copper sulfate, or combinations thereof.

According to a seventh aspect, which includes any of the first through sixth aspects, the platinum compound comprises a platinum salt selected from the group of Pt(NH$_3$)Cl$_2$, PtCl$_2$, PtCl$_4$, (NH$_4$)2PtCl$_6$, (NH$_4$)2Pt(NO$_3$)$_2$, Na$_2$PtCl$_6$.6H$_2$O, H$_2$PtCl$_6$.6H$_2$O, Na$_2$PtCl$_4$.4H$_2$O, (NH$_4$)2PtCl$_4$, or combinations thereof.

According to an eighth aspect, which includes any of the first through seventh aspects, the pre-catalyst mixture comprises xNaOH: 1Al$_2$O$_3$: 2SiO$_2$: yNaCl: z(NH$_4$)2PtCl$_4$: wH$_2$O, where x=10-30, y=0-10, z=0.02-0.5, and w=100-500.

According to a ninth aspect, which includes any of the first through eighth aspects, the method further comprises blending the platinum encapsulated zeolite with zeolite Y.

According to a tenth aspect, which includes any of the first through ninth aspects, the method may further comprise adding one or more metal-based catalysts selected from nickel, molybdenum, tungsten, or combinations thereof to the hydrocracking catalyst.

According to an eleventh aspect, which includes any of the first through tenth aspects, the method of adding may involve mixing or impregnation into zeolite Y, the platinum encapsulated zeolite, or combinations thereof.

According to a twelfth aspect, a hydrocracking catalyst comprises platinum encapsulated zeolite, the platinum encapsulated zeolite having a crystallinity greater than 20% determined by X-ray powder diffraction analysis.

According to a thirteenth aspect, which includes the twelfth aspect, the hydrocracking catalyst comprises greater than 35% crystallinity.

According to a fourteenth aspect, which includes any of the twelfth through thirteenth aspects, the zeolite comprises sodalite.

According to a fifteenth aspect, which includes any of the twelfth through fourteenth aspects, the sodalite comprises a pore size of 1.0 to 3.0 nanometers.

According to a sixteenth aspect, which includes any of the twelfth through fifteenth aspects, the hydrocracking catalyst further comprises zeolite Y, and optionally alumina.

According to a seventeenth aspect, which includes any of the twelfth through sixteenth aspects, the hydrocracking catalyst further comprises nickel, molybdenum, tungsten, or combinations thereof.

According to an eighteenth aspect, which includes any of the twelfth through seventeenth aspects, the hydrocracking catalyst comprises from 10 to 20 wt. % $MoO_3$, from 1 to 10 wt. % NiO, from 20 to 80 wt. % $Al_2O_3$, and from 10 to 60 wt. % of platinum encapsulated sodalite and zeolite Y.

According to a nineteenth aspect, which includes any of the twelfth through seventeenth aspects, the hydrocracking catalyst comprises from 20 to 30 wt. % $WO_3$, from 1 to 10 wt. % NiO, from 20 to 80 wt. % $Al_2O_3$, and from 10 to 60 wt. % of platinum encapsulated sodalite and zeolite Y.

According to a twentieth aspect, which includes any of the twelfth through nineteenth aspects, the hydrocracking catalyst comprises from 1 to 10 wt. % sodalite and platinum combined.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A method of producing a hydrocracking catalyst, in which the method comprises:
   adding sodium hydroxide, an aluminum compound, a salt having an anion and a cation, and a silicon compound to an aqueous solution to form an aqueous mixture;
   stirring the aqueous mixture;
   adding a platinum compound to the aqueous mixture to form a pre-catalyst mixture;
   heating the pre-catalyst mixture at from 80° C. to 200° C. for at least 24 hours, thereby crystalizing the pre-catalyst mixture to form the hydrocracking catalyst comprising platinum encapsulated zeolite;
   blending the platinum encapsulated zeolite with zeolite Y, and optionally alumina; and
   adding one or more metal-based catalysts selected from nickel, molybdenum, tungsten, or combinations thereof to the hydrocracking catalyst, in which the hydrocracking catalyst comprises greater than 20% crystallinity determined by X ray powder diffraction analysis.

2. The method of claim 1, wherein the platinum encapsulated zeolite is platinum encapsulated sodalite.

3. The method of claim 1, in which the aluminum compound comprises aluminum metal powder, aluminum hydroxide, sodium aluminate, or combinations thereof.

4. The method of claim 1, in which the silicon compound comprises silica, sodium silicate, colloidal silica, fumed silica, or combinations thereof.

5. The method of claim 1, in which the salt comprises sodium chloride, potassium dichromate, calcium chloride, sodium bisulfate, copper sulfate, or combinations thereof.

6. The method of claim 1, in which the platinum compound comprises a platinum salt selected from the group of $Pt(NH_3)Cl_2$, $PtCl_2$, $PtCl_4$, $(NH_4)2PtCl_6$, $(NH_4)2Pt(NO_3)_2$, $Na_2PtCl_6.6H_2O$, $H_2PtCl_6.6H_2O$, $Na_2PtCl_4.4H_2O$, $(NH_4)2PtCl_4$, or combinations thereof.

7. The method of claim 1, in which the pre-catalyst mixture comprises $xNaOH: 1Al_2O_3: 2SiO_2: yNaCl: z(NH_4)2PtCl_4: wH_2O$, where $x=10-30$, $y=0-10$, $z=0.02-0.5$, and $w=100-500$.

8. The method of claim 1, in which the adding of one or more metal-based catalysts involves mixing or impregnation into zeolite Y, the platinum encapsulated zeolite, or combinations thereof.

9. A hydrocracking catalyst comprising:
   platinum encapsulated zeolite, the platinum encapsulated zeolite having a crystallinity greater than 20% determined by X-ray powder diffraction analysis;
   zeolite Y, optionally alumina; and
   nickel, molybdenum, tungsten, or combinations thereof.

10. The hydrocracking catalyst of claim 9, in which the hydrocracking catalyst comprises greater than 35% crystallinity.

11. The hydrocracking catalyst of claim 9, wherein the platinum encapsulated zeolite comprises platinum encapsulated sodalite.

12. The hydrocracking catalyst of claim 11, wherein the platinum encapsulated sodalite comprises a pore size of 0.10 to 0.30 nanometers.

13. The hydrocracking catalyst of claim 11, in which the hydrocracking catalyst comprises from 10 to 20 wt. % $MoO_3$, from 1 to 10 wt. % NiO, from 20 to 80 wt. % $Al_2O_3$, and from 10 to 60 wt. % of platinum encapsulated sodalite and zeolite Y combined.

14. The hydrocracking catalyst of claim 11, in which the hydrocracking catalyst comprises from 20 to 30 wt. % $WO_3$, from 1 to 10 wt. % NiO, from 20 to 80 wt. % $Al_2O_3$, and from 10 to 60 wt. % of platinum encapsulated sodalite and zeolite Y combined.

15. The hydrocracking catalyst of claim 11, in which the hydrocracking catalyst comprises from 1 to 10 wt. % platinum encapsulated sodalite and platinum combined.

* * * * *